Aug. 21, 1923.

K. I. NUTTER 1,465,718

DEMOUNTABLE WHEEL RIM

Filed July 25, 1921

INVENTOR:
Karl I. Nutter,
BY E. D. Silvius,
ATTORNEY.

Patented Aug. 21, 1923.

1,465,718

UNITED STATES PATENT OFFICE.

KARL I. NUTTER, OF MARTINSVILLE, INDIANA.

DEMOUNTABLE WHEEL RIM.

Application filed July 25, 1921. Serial No. 487,431.

*To all whom it may concern:*

Be it known that I, KARL I. NUTTER, a citizen of the United States, residing at Martinsville, in the county of Morgan and State of Indiana, have invented a new and useful Demountable Wheel Rim, of which the following is a specification, reference being had to the accompanying drawings and to the letters and figures of reference marked thereon.

This invention relates to a wheel of the type that is designed to have a removable pneumatic tire, more particularly an automobile wheel, and the invention relates especially to a wheel having a rim that may be quickly removed with a damaged tire thereon, or be easily and quickly applied to the wheel with a new or repaired tire thereon ready for use.

An object of the invention is to provide an improved wheel and demountable rim that shall be of simple and reliable construction and not costly in production, and especially adapted for small wheel construction.

Another object is to provide a simple and powerful means for quickly securing a demountable rim to a wheel felly or felly portion and which shall be capable of being easily operated.

A further object is to provide simple and positive gearing in a vehicle wheel for tightening a demountable rim thereon and so as to be secure against accidental displacement under operating conditions, and which shall be durable and economical in use.

With the above-mentioned and other objects in view, the invention consists in a wheel provided with a power worm and operating gears therefor, and in a demountable rim having a worm-engaging device whereby the rim may be forcibly moved circumferentially on the wheel, in connection with wedging devices between the wheel and the rim; and, the invention consists also further in the parts and combinations and arrangements of parts as hereinafter particularly described and further defined in the appended claims.

Referring to the drawings.—Figure 1 is a front view of an automobile wheel provided with the invention; Fig. 2 is a fragmentary transverse section of the improved wheel with a pneumatic tire thereon; Fig. 3 is a peripheral view of the felly portion of the improved wheel; Fig. 4 is a sectional elevation of the improved rim; Fig. 5 is a fragmentary central section of the improved structure showing particularly the means for moving the rim of the wheel; Fig. 6 is a fragmentary sectional view approximately on the line VI—VI in Fig. 5; and, Fig. 7 is a transverse section approximately on the line VII—VII in Fig. 5.

Similar reference characters in the different figures of the drawings indicate like or corresponding elements or features of construction herein referred to in detail.

As illustrative of the invention and purposes thereof a wooden spoke wheel is shown which comprises generally a hub 1, spokes 2 and a felly 3, and it is to be understood that the felly may be practically a portion of a disk wheel or may be a hollow metallic felly slightly modified. In the present case the felly is composed of wood and a relatively small metallic section 4 constructed to constitute a gear case having an outer peripheral face 5 conforming to the peripheral contour of the felly, and the sides of the gear case form continuations of the side faces of the felly. The gear case has a chamber 6 that has an opening extending to the face 5 and the case has also another chamber 7 therein separated by a partition 8 which is designed to constitute a journal bearing, and the end of the case opposite to the partition is adapted to constitute a journal bearing 9. The gear case has a guard wall 10 projecting from the face 5 and extending about the opening of the chamber 6 to exclude dust or mud from the chamber when covered by the improved rim. The side walls 11 and 12 of the chamber 7 are designed to constitute journal bearings. One end of the gear case preferably has ears 13 and 14 which are connected by means of a bolt 15 to the adjacent portion of the wooden felly, and the opposite end of the gear case has similar ears 16 and 17 which are connected by means of a bolt 18 to the adjacent portion of the felly which extends between the ears. The felly has a band 19 thereon which has a suitable aperture through which the wall 10 extends, and preferably the band has a flange 20 on the inner or rearward edge thereof. The outer face or periphery of the band is provided with bearing blocks 21 suitably spaced apart, each block having an inclined end or wedge face 22 in a recess which has an inclined side wedge face 23 presented towards the flange 20 and towards the opposite wall 24 of the recess.

A demountable rim 25 is designed to be placed on the felly band and loosely embrace the bearing blocks and it is provided on its inner side with a suitable number of wedge blocks 26 having each an inclined face 27 to co-operate with the end face 22, and the wedge block has a beveled or inclined face 28 adapted to co-operate with the face 23 to force the rim tightly to the flange 20, or so that the wedge blocks shall be tightly forced to the walls 24 in case the flange 20 is omitted from the felly band. The rim is provided also on its inner side with a lug 29 which has a gear tooth or teeth 30 on its end, the lug being designed to be entered into the chamber 6. The ring 25 has also flanges or beads 31 and 32 on its outer side and preferably has a flange-like ring 33 on its inner side that extends opposite to the front of the felly to prevent dust or mud from entering the space between the felly and the rim. A pneumatic tire 34 is suitably secured to the rim in such manner as to permit it to be removed and repaired.

A power worm is arranged in the chamber 6 of the gear case and comprises a body portion 35 which has two journals 36 and 37 arranged in the bearing chambers 8 and 9, respectively, and the body portion has coarse screw threads 38 thereon to operate in connection with the teeth on the lug 29. The journal 36 has a bevel gear or toothed wheel 39 fixed thereon so as to be inclosed in the chamber 7. An operating shaft 40 is arranged in the chamber 7 and has journals 41 and 42 rotatively supported in the wall portions 11 and 12 respectively, and the shaft has a beveled gear or toothed wheel 43 fixed thereon that is in mesh with the gear 39. The shaft 40 has a squared terminal portion 44 which extends beyond the journal 42 into a recess 45 provided in the adjacent side of the gear case; the recess preferably having a cap 46 screwed into it to cover and protect the end of the operating shaft.

In practical use a spare tire is carried on a rim in inflated condition, and when needed to replace a damaged tire the rim, by which the damaged tire is connected to the wheel, is readily removed after operating the shaft 40 so as to operate the worm by which the rim is moved circumferentially so as to force the wedge blocks from the bearing blocks, after which the spare rim is put in place on the wheel, first inserting the lug 29 in the chamber 6 with the rim in tilted position and then swinging the remaining portion of the rim into place on the wheel felly, following which the shaft 40 is operated in the opposite direction to cause the worm to move the rim and cause action of the wedging devices whereby the rim is forced back against the stops designed for the purpose and simultaneously centered and tightened on the wheel felly. During operation of the wheel the worm threads serve as a locking abutment preventing movement of the lug 29 and the demountable rim circumferentially, therefore insuring rigid locking connection of the wedging devices between the felly and the rim.

What I claim is:—

1. A vehicle wheel including a wheel felly, a hollow gear case secured in the felly and having a relatively small lug-receiving opening in the outer wall portion thereof, a worm having two journals rotatably supported in the gear case adjacent to said opening, the worm being provided with gearing at the end of one of the journals to operate and control it, and a continuous wedge-equipped band embracing the felly and the gear case and fixedly secured thereto.

2. A vehicle wheel including a wheel felly, a hollow gear case secured in the felly and constituting a part thereof, the peripheral portion of the gear case having a relatively small lug-receiving opening therein and a guard wall extending about the opening, a worm in the gear case adjacent to said opening and provided with two rotatably supported journals, one of the journals having a gear on the end thereof, and an operating shaft rotatably supported in the wall of the gear case and having a gear thereon engaging the gear on the journal.

3. A vehicle wheel including a wheel felly, a gear case secured in the felly and having chambers therein, one of the chambers having a worm therein provided with a journal extending into the adjacent chamber, the journal having a gear thereon, an operating shaft rotatable in said adjacent chamber and having a gear thereon engaging the gear on the journl, a band on the felly, bearing blocks on the band, a rim extending about the felly and having a lug device thereon in connection with the worm, and wedge blocks on the rim to co-operate with the bearing blocks.

4. A vehicle wheel including a felly member having a separate segment secured thereto, the segment being hollow and having an opening extending through the outer face thereof, a band on the felly member extending over the segment thereof and having an aperture continuous with said opening, beveled bearing blocks on the band, a worm rotatably supported in said segment, a rim extending about the band and having a lug device fixed thereon and extending through said aperture and said opening and having engagement with the worm, and wedge blocks on the rim co-operating with the bearing blocks.

5. A vehicle wheel including a wheel felly, a hollow gear case secured in the felly and having an opening extending to the periphery of the felly, the outer face of the gear case conforming to the periphery and having a wall thereon extending about the opening, a worm rotatable in the gear case opposite to said opening, a band on the felly and having an aperture receiving said wall, bearing blocks on the band, a rim extending about the band and over said wall and having a lug thereon extending through said opening, the lug being embraced by said wall and having a screw-thread segment on its end in engagement with the worm, and wedge blocks on the rim to cooperate with the bearing blocks.

6. In a demountable wheel rim, the combination with a wheel felly portion, of a gear case secured in the felly portion and having two chambers therein, a worm body arranged in one of the chambers and having screw threads thereon, said body having also journals supported in adjacent walls of said case, one of the journals extending into the adjacent one of the chambers and having a bevel gear thereon, a driving shaft arranged in said adjacent one of the chambers and having journals supported in the opposite walls of the chambers, one of the journals having a squared terminal portion, said shaft having a bevel gear thereon engaging the bevel gear on said journal, a cap secured to said case and covering said squared portion, and a rim having a lug provided with a screw thread segment for engagement with the screw threads on said worm body.

In testimony whereof, I affix my signature in presence of two witnesses.

KARL I. NUTTER.

Witnesses:
E. T. SILVIUS,
ROBERT LIEBRICH.